UNITED STATES PATENT OFFICE.

GRANVILLE M. BREINIG, OF NEW MILFORD, CONNECTICUT.

METHOD OF PRODUCING ARTIFICIAL STONE.

SPECIFICATION forming part of Letters Patent No. 410,635, dated September 10, 1889.

Application filed January 30, 1889. Serial No. 298,126. (No specimens.)

*To all whom it may concern:*

Be it known that I, GRANVILLE M. BREINIG, a citizen of the United States, residing at New Milford, in the county of Fairfield and State of Connecticut, have invented a new and useful Improved Method of Producing Artificial Stone which is fully set forth in the following specification.

The object of my invention is to produce an artificial stone not costly in materials used or in their adaptation to the desired composition, which has been found to possess remarkable adaptability to the requirements of emery-wheels, grindstones, hones, files, and the like.

Heretofore emery-wheels have been produced by binding the particles of emery together by shellac, glue, clay, or other substances destitute of any abrading or cutting property in themselves, and which were therefore, to the extent of their use, a detriment to the wheel, impairing its grinding efficiency.

My experiments revealed that feldspar and silicate of soda or potash combined with emery, ground silex, or corundum in proper proportions when fused would bind the particles of emery, silex, or corundum insolubly together, the feldspar not detracting from the hard cutting properties of the main constituent. The proportions to be used are one part of ground feldspar, either soda or potash, and twelve parts of emery, corundum, or ground silex. Silicate of soda or silicate of potash is then to be added, so that the mass may be molded into desired shape. The new composition of matter is then obtained by subjecting those ingredients, when dry enough to handle, to the heat of a potter's biscuit kiln.

In fusing the feldspar and silicate of soda disappear, or so combine with the emery, corundum, or silex as to bind the particles of emery, corundum, or ground silex together into one mass without impairing their cutting or grinding quality as particles.

What I claim, and desire to secure by Letters Patent, is—

The within-described composition of matter, consisting, in the proportions named, of emery, ground silex, or corundum, feldspar, and silicate of soda, consolidated by the treatment specified.

GRANVILLE M. BREINIG.

Witnesses:
S. J. GORDON,
JOHN W. RIPLEY.